US010584813B2

United States Patent
Leys et al.

(10) Patent No.: US 10,584,813 B2
(45) Date of Patent: Mar. 10, 2020

(54) ANTI-ROTATION DEVICE FOR HYDRAULIC CONNECTORS

(71) Applicant: ENTEGRIS, INC., Billerica, MA (US)

(72) Inventors: John A. Leys, Chaska, MN (US); Michael Schleicher, Victoria, MN (US); Jeffrey J. McKenzie, Watertown, MN (US)

(73) Assignee: Entegris, Inc., Billerica, MA (US)

( * ) Notice: Subject to any disclaimer, the term of this patent is extended or adjusted under 35 U.S.C. 154(b) by 0 days.

(21) Appl. No.: 15/037,282

(22) PCT Filed: Nov. 23, 2015

(86) PCT No.: PCT/US2015/062125
§ 371 (c)(1),
(2) Date: May 17, 2016

(87) PCT Pub. No.: WO2017/044140
PCT Pub. Date: Mar. 16, 2017

(65) Prior Publication Data
US 2018/0172187 A1 Jun. 21, 2018

Related U.S. Application Data

(60) Provisional application No. 62/216,608, filed on Sep. 10, 2015.

(51) Int. Cl.
*F16L 15/08* (2006.01)
*F16L 19/00* (2006.01)
(52) U.S. Cl.
CPC ............. *F16L 15/08* (2013.01); *F16L 19/005* (2013.01)

(58) Field of Classification Search
CPC ........ F16L 15/08; F16L 19/005; F16L 33/035; F16L 3/105; F16L 3/1091; F16L 3/1211; F16L 33/02; B65D 63/1063
(Continued)

(56) References Cited

U.S. PATENT DOCUMENTS 4,007,953 A 2/1977 Powell
4,183,120 A * 1/1980 Thorne ................. F16L 33/035
(Continued)

FOREIGN PATENT DOCUMENTS

CN 2491681 Y 5/2002
CN 202733190 U 2/2013
(Continued)

OTHER PUBLICATIONS

"PrimeLock® Minimum Tube Unions," P/N 01-1023457 (Rev. C Mar. 2013), Mar. 2013.

*Primary Examiner* — Zachary T Dragicevich
(74) *Attorney, Agent, or Firm* — Entegris, Inc.

(57) ABSTRACT

An anti-rotation device for preventing a hydraulic connector assembly from leaking. Various embodiments of the anti-rotation device provide a mechanism whereby threadably engaged connectors, such as compression fittings, are permitted to rotate only a fraction of a turn after loosening. For many applications, the limited degree of loosening is sufficient to prevent the onset of leaking. Structurally, the anti-rotation device can include a band that is secured to a female nut of a hydraulic connector. Protrusions extend laterally from the band and engage with a stop tab on the male body of the hydraulic connector assembly, thereby limiting rotation of the female nut that would otherwise cause leaks. Locking provided by zip tie structures proximate the free ends of the anti-rotation device.

19 Claims, 9 Drawing Sheets

(58) Field of Classification Search
USPC .......... 285/92, 420, 421; 24/17 A, 17 B, 19, 24/274 R, 274 P, 274 WB
See application file for complete search history.

(56) References Cited

U.S. PATENT DOCUMENTS

| | | | |
|---|---|---|---|
| 4,453,289 A * | 6/1984 | Kleykamp | |
| 4,591,192 A | 5/1986 | Van Exel et al. | |
| 5,192,219 A * | 3/1993 | Fowler | ........................ 285/92 X |
| 6,073,973 A * | 6/2000 | Boscaljon | ............ F16L 19/005 |
| | | | 285/92 X |
| 7,761,962 B2 * | 7/2010 | Krauss | ............................. 24/19 |
| 2003/0168854 A1 | 9/2003 | Lebreton et al. | |
| 2003/0209908 A1 | 11/2003 | Vanasse | |
| 2004/0080158 A1 * | 4/2004 | King, Jr. | ............... F16L 37/008 |
| | | | 285/197 |
| 2009/0158559 A1 * | 6/2009 | Chardon | ............... F16L 33/035 |
| 2016/0340093 A1 * | 11/2016 | Muller | ................. F16L 33/035 |

FOREIGN PATENT DOCUMENTS

| | | |
|---|---|---|
| KR | 10-2005-002536 | 3/2005 |
| KR | 10-0856735 | 8/2008 |
| KR | 10-2011-0081516 A | 7/2011 |
| KR | 10-1350863 | 1/2014 |
| TW | 322244 B | 3/2010 |
| WO | WO 2015/061501 A1 | 4/2015 |

* cited by examiner

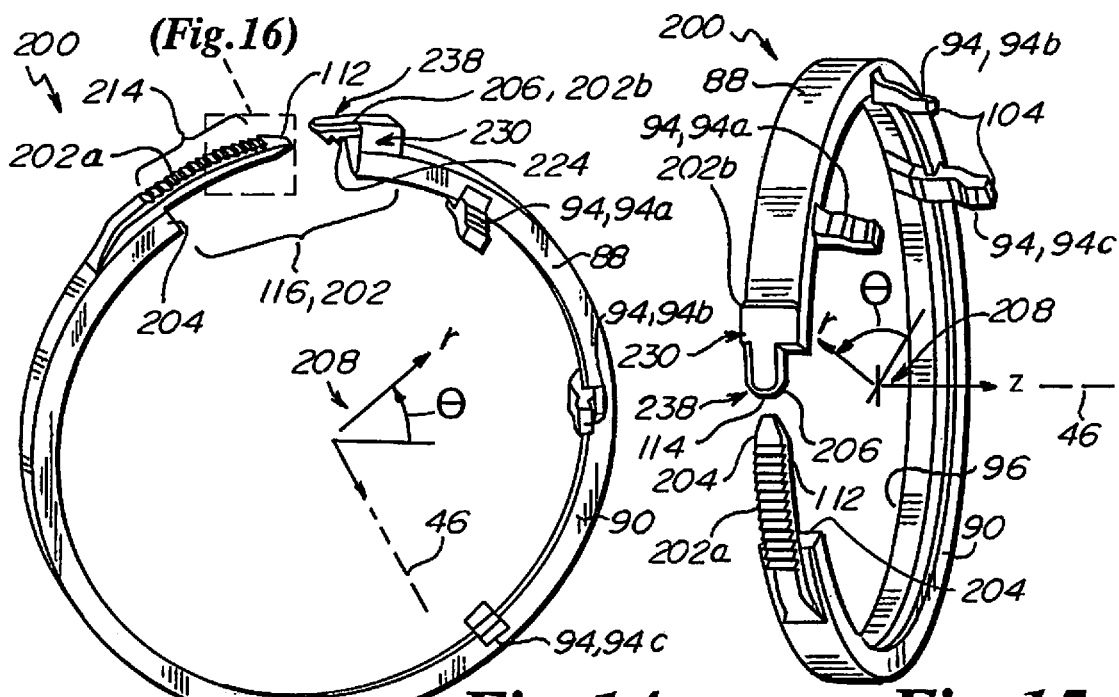
*Fig.14*  *Fig.15*
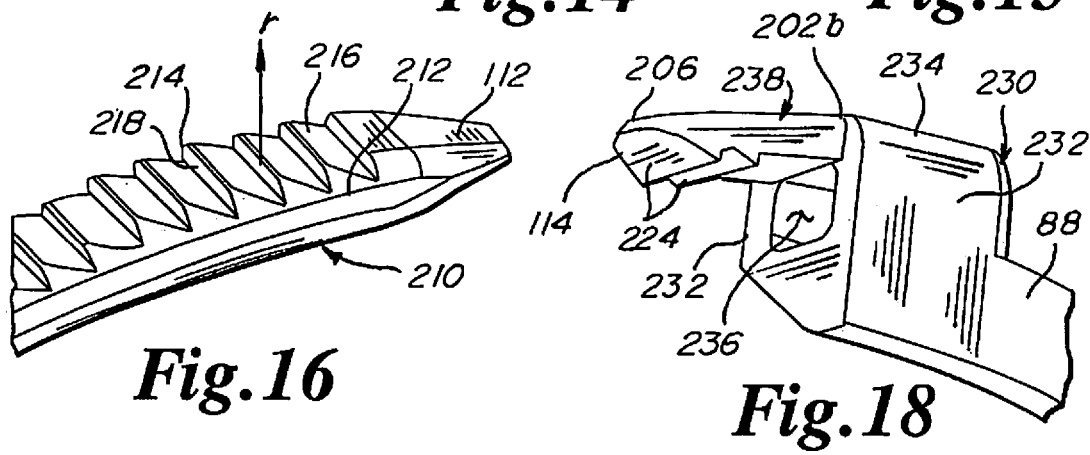
*Fig.16*  *Fig.18*
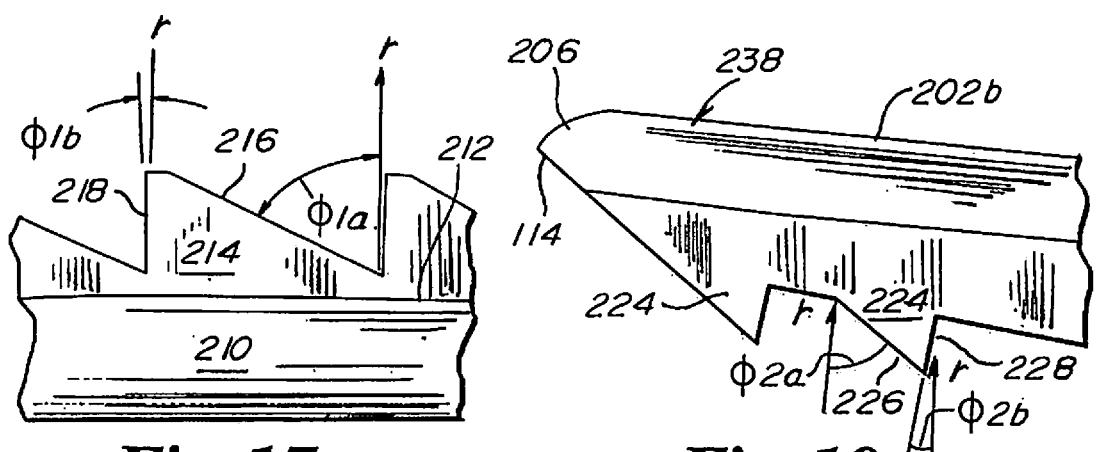
*Fig.17*  *Fig.19*

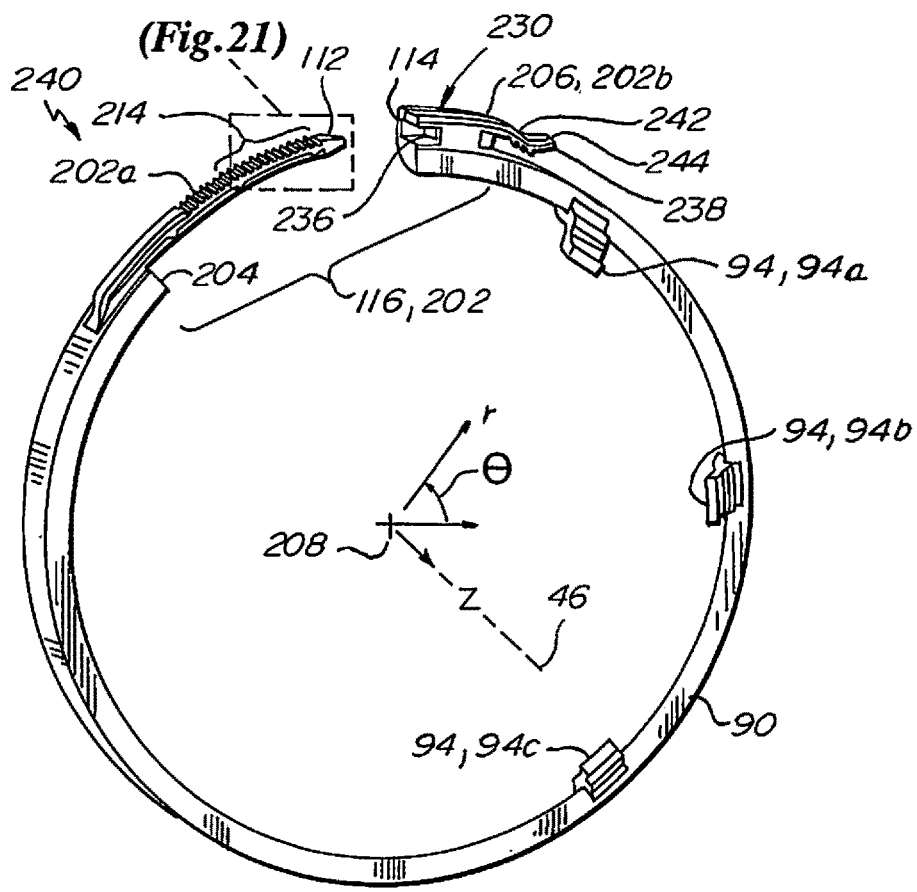
Fig. 20
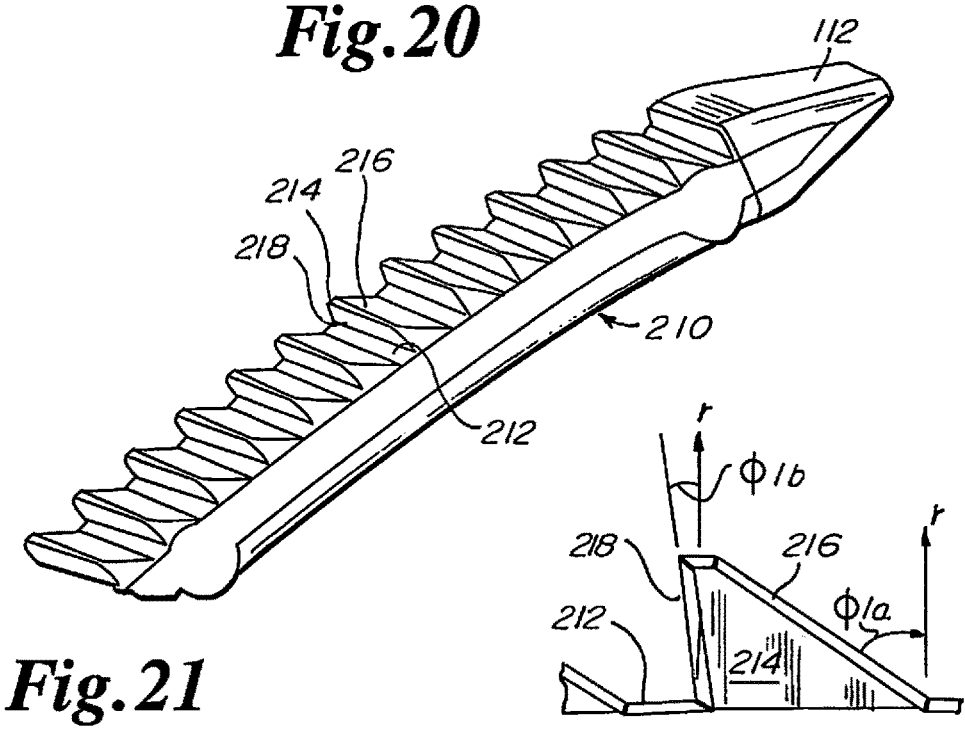
Fig. 21
Fig. 22

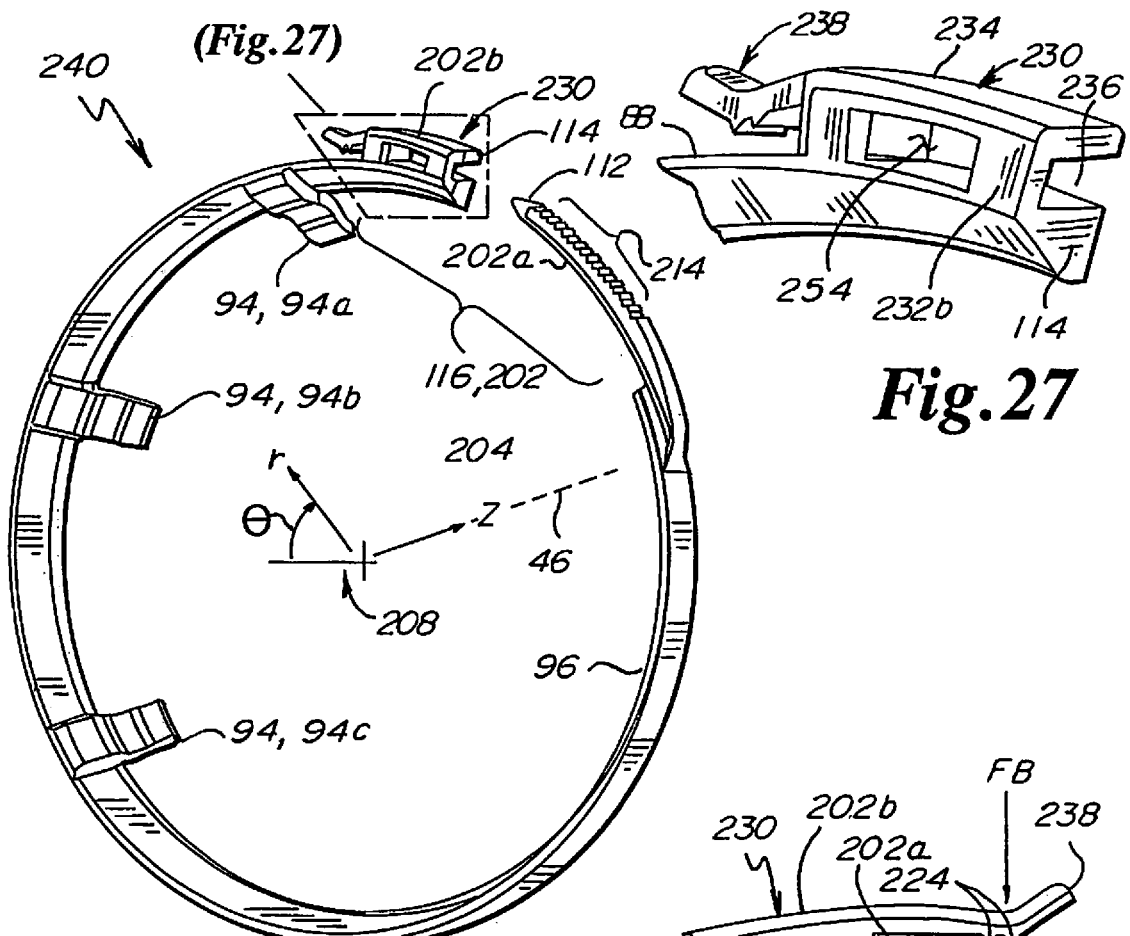
Fig.27
Fig.26
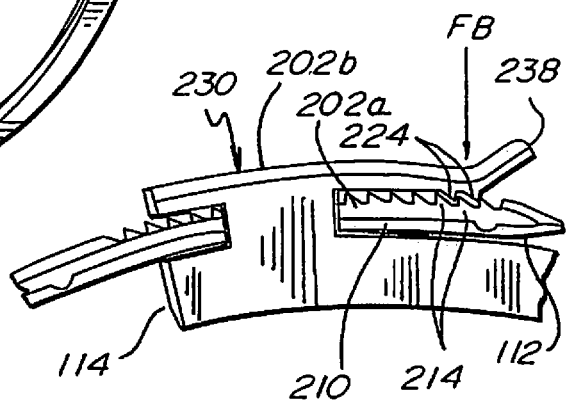
Fig.28
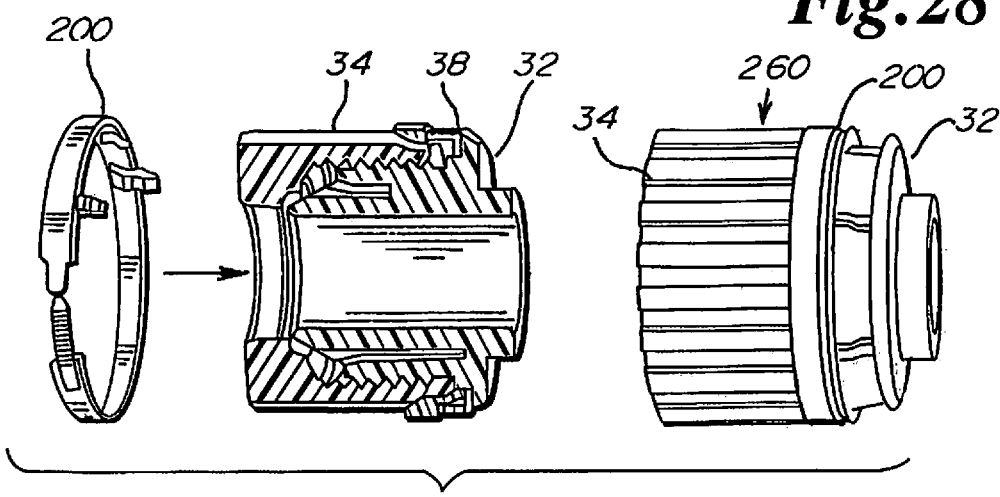
Fig.29

ANTI-ROTATION DEVICE FOR HYDRAULIC CONNECTORS

This present application is a National Phase entry of PCT Application No. PCT/US2015/062125, filed Nov. 23, 2015, which claims the benefit of U.S. Provisional Patent Application No. 62/216,608, filed Sep. 10, 2015, the disclosures of which are incorporated by reference herein in their entireties.

FIELD OF THE DISCLOSURE

The disclosure is directed to the field of hydraulic connectors generally, and more specifically to locking devices for hydraulic connectors including a polymer or fluoropolymer material.

BACKGROUND

The use of hydraulic connectors fabricated from polymers or fluoropolymers have found favor in the handling of caustic fluids, such as found in the semiconductor and related industries. A characteristic of these connectors is that they tend to loosen after reaching elevated temperatures. For example, fluoropolymer hydraulic connectors have been observed to loosen after just a single thermal cycle to approximately 200° C. (about 393° F.). Repeated thermal cycling can cause the connector to loosen further. Also, once loosened, vibration experienced by the hydraulic connector during operation can cause further loosening. Eventually, the loosening can cause the hydraulic connector to leak. Fittings can also loosen under vibration conditions such as when complete assemblies with fittings are shipped from the assembly location to their final destination.

A system that prevents hydraulic connectors from loosening to the point of leaking would be welcomed.

SUMMARY

Various embodiments of the present disclosure provide a locking device whereby threadably engaged connectors, such as compression fittings, are permitted to rotate only a fraction of a turn after loosening. For many applications, the limited degree of loosening is sufficient to prevent the onset of leaking. Some embodiments can also be retrofitted to commonly used compression fittings, such as flare, insert, or insert style fittings, as well as the PRIMELOCK® fittings manufactured by Entegris, Inc. In various embodiments, the locking device can be tightened onto the connector to the user's liking. In some embodiments, the locking device can be retightened should the locking device loosen, for example due to thermal cycling.

Structurally, various embodiments of the disclosure disclose a hydraulic connector assembly including a male body threadably engaged with a female nut, the male body including a stop tab that extends radially outward therefrom and the female nut being concentric about a central axis and including a recess formed on an exterior surface thereof. The assembly also includes an anti-rotation band engaged with and extending tangentially around the female nut to define a proximal edge of the anti-rotation band, the anti-rotation band including a protrusion having a base portion and a projecting portion, the base portion extending radially inward from an interior surface of the anti-rotation band and being disposed within the recess of the female nut, the anti-rotation band including opposed end portions that define zip tie fastening structures. Rotation of the female nut relative to the male body causes the anti-rotation band to rotate therewith and causes the projecting portion of the protrusion to engage with the stop tab of the male body, thereby preventing further rotation of the female nut. In some embodiments, the zip tie fastening structures are releasable.

In some embodiments, a first end portion of the opposed end portions includes a first zip tie fastening structure that defines a plurality of sawtooth structures, each of the plurality of sawtooth structures including a sliding face and a locking face. A second end portion of the opposed end portions includes a first zip tie fastening structure that defines at least one locking tooth structure, each of the at least one locking tooth structure including a sliding face and a locking face. In some embodiments, the sliding face of the at least one locking tooth structure of the second zip tie fastening structure is configured to slide over the sliding face of each of the plurality of sawtooth structures of the first zip tie fastening structure. In some embodiments, the locking face of the at least one locking tooth structure of the second zip tie fastening structure is complementary to the locking face of each of the plurality of sawtooth structures of the first zip tie fastening structure for interlocking with any one of the plurality of sawtooth structures of the first zip tie fastening structure.

In one or more embodiments, the second end portion includes an alignment structure for aligning the first end portion with the second end portion in a tangential direction when the first zip tie fastening structure is interlocked with the second zip tie fastening structure. The at least one locking tooth structure of the second zip tie fastening structure may be defined on a tab portion, the tab portion extending in the tangential direction from the alignment structure. In some embodiments, the alignment structure of the anti-rotation band defines a free end of the second end portion, the tab portion extending away from the free end.

In various embodiments of the disclosure, an anti-rotation band for a hydraulic connector is disclosed as including a band portion including opposed free ends and defining a proximal edge, the opposed end portions including zip tie fastening structures. The anti-rotation band also includes a plurality of protrusions that extend from the band portion, each of the plurality of protrusions extending proximal to the proximal edge. The anti-rotation band may include a first end portion of the opposed end portions including a first zip tie fastening structure that defines a plurality of sawtooth structures, each of the plurality of sawtooth structures including a sliding face and a locking face. The anti-rotation band may also include a second end portion of the opposed end portions including a second zip tie fastening structure that defines at least one locking tooth structure, each of the at least one locking tooth structure including a sliding face and a locking face. In some embodiments, the sliding face of the at least one locking tooth structure of the second zip tie fastening structure is configured to slide over the sliding face of each of the plurality of sawtooth structures of the first zip tie fastening structure. In some embodiments, the locking face of the at least one locking tooth structure of the second zip tie fastening structure is complementary to the locking face of each of the plurality of sawtooth structures of the first zip tie fastening structure for interlocking with any one of the plurality of sawtooth structures of the first zip tie fastening structures. The second end portion may include an alignment structure for aligning the first end portion with the second end portion in a tangential direction when the first end portion is interlocked with the second end portion.

In some embodiments, the at least one locking tooth structure of the second end portion is defined on a tab portion, the tab portion extending in the tangential direction from the alignment structure. The alignment structure of the anti-rotation band may define a free end of the second end portion, the tab portion extending away from the free end.

In various embodiments of the disclosure, a method for preventing a hydraulic connector assembly from leaking is disclosed, including:

providing an anti-rotation band that includes a band portion and a protrusion that extends from the band portion, the protrusion including a base portion that extends laterally from the band portion and a projecting portion extending axially from the base portion, the band portion including opposed end portions, a first end portion of the opposed end portions includes a first zip tie structure having a plurality of sawtooth structures, a second end portion of the opposed end portions including a second zip tie structure having at least one locking tooth structure configured to interlock with any of the plurality of sawtooth structures of the first end portion, the second zip tie structure including an alignment structure for guiding the zip tie structure into interlocking contact with the second zip tie structure, the at least one locking tooth structure of the second zip tie structure being defined on a tab portion, the tab portion extending in the tangential direction from the alignment structure; and providing a set of instructions on a tangible, non-transitory medium, the instructions including:

wrapping the anti-rotation band around a female nut of a hydraulic connector assembly; and securing the anti-rotation band on the female nut by mating the first zip tie structure to the second zip tie structure, so that the projecting portion of the protrusion extends tangentially adjacent to a stop tab located on a male body of the hydraulic connector assembly.

In various embodiments, the set of instructions includes lifting the tab portion of the second zip tie structure away from the first zip tie structure to release the anti-rotation band.

Various embodiments of the hydraulic connector assembly disclosed herein include a male body threadably engaged with a female nut, the male body including a stop tab that extends radially outward therefrom, the female nut being concentric about a central axis and including a recess formed on an exterior surface thereof, the female nut including a proximal end that is distal to the stop tab. An anti-rotation band is engaged with and extends tangentially around the female nut to define a proximal edge of the anti-rotation band. The anti-rotation band includes a protrusion having a base portion and a projecting portion, the base portion extending radially inward from an interior surface of the anti-rotation band, the projecting portion of the protrusion extending beyond the proximal edge of the anti-rotation band in a direction parallel to the central axis. The base portion of the protrusion can be disposed within the recess of the female nut. In various embodiments, rotation of the female nut relative to the male body causes the anti-rotation band to rotate therewith and causes the projecting portion of the protrusion to engage with the stop tab of the male body, thereby preventing further rotation of the female nut. In various embodiments, the ends of the anti-rotation band include zip tie fastening structures for clasping the ends together and applying a hoop tension on the locking device to secure the anti-rotation band to the female nut.

In various embodiments, a hydraulic connector assembly is disclosed, including a male body threadably engaged with a female nut, the male body including a stop tab that extends radially outward therefrom, the female nut being concentric about a central axis and including a recess formed on an exterior surface thereof. An anti-rotation band is engaged with and extends tangentially around the female nut to define a proximal edge of the anti-rotation band. The anti-rotation band can include a protrusion having a base portion and a projecting portion. The base portion can extend radially inward from an interior surface of the anti-rotation band, the base portion being disposed within the recess of the female nut. In one embodiment, the projecting portion of the protrusion extends beyond the proximal edge of the anti-rotation band in a direction parallel to the central axis. Rotation of the female nut relative to the male body causes the anti-rotation band to rotate therewith and causes the projecting portion of the protrusion to engage with the stop tab of the male body, thereby preventing further rotation of the female nut. The stop tab can be arcuate. The recess can be substantially parallel to the central axis. In one embodiment, the recess is one of a plurality of recesses defined on the exterior surface and distributed about the central axis, each of the plurality of recesses being dimensioned to mate with the base portion of the protrusion. The recesses can be uniformly distributed about the central axis. In one embodiment, the anti-rotation band extends tangentially around the circumference of the exterior surface of the female nut. In one embodiment, anti-rotation band includes free ends and complementary clasping arrangements for joining the free ends together. The hydraulic connector assembly can further include a retention ring coupled with the anti-rotation band, the retention ring maintaining the protrusion in an orientation for engagement with the stop tab. In one embodiment, the retention ring is a verification structure.

In various embodiments, a maximum degree of rotation of the female nut relative to the male body before the protrusion engages the stop tab is between 60° and 90° inclusive. For some of these embodiments, the maximum degree of rotation is not greater than 80°. In some embodiments, the maximum degree of rotation of the female nut relative to the male body before the protrusion engages the stop tab is between 65° and 75° inclusive. In still other embodiments, a maximum degree of rotation of the female nut relative to the male body before the protrusion engages the stop tab is between 3° and 25° inclusive. In certain embodiments, the maximum degree of rotation of the female nut relative to the male body before the protrusion engages the stop tab is between 5° and 20° inclusive; for some of these embodiments, the maximum degree of rotation is not greater than 15°; for others of these embodiments, the maximum degree of rotation is not greater than 10°.

In various embodiments of the disclosure, an anti-rotation band for a hydraulic connector is disclosed, including a band portion including opposed free ends and defining a proximal edge, and a plurality of protrusions that extend from the band portion, each of the plurality of protrusions extending proximal to the proximal edge. The band portion can define a surface extending from the proximal edge of the band portion, wherein each of the plurality of protrusions includes a base portion, each of the base portions extending from the surface of the band portion. In one embodiment, the band portion is a cable tie.

In one embodiment, the plurality of protrusions includes three protrusions. A distance between a first of the three protrusions and a second of the three protrusions is equal to a distance between the second of the three protrusions and a third of the three protrusions. The band can be arcuate, with the surface being an interior surface. The anti-rotation band can further include a clasping arrangement for selectively joining the opposed free ends of the band portion. In one embodiment, the anti-rotation band is substantially circular about a central axis when the opposed free ends are selectively joined with the clasping arrangement, such that a first of the three protrusions and a second of the three protrusions are centered about the central axis to define a first angle, and the second of the three protrusions and a third of the three protrusions are centered about the central axis to define a second angle, the first angle being substantially equal to the second angle. In one embodiment, the first angle and the second angle are substantially 60°.

In various embodiments of the disclosure, a method for preventing a hydraulic connector assembly from leaking is disclosed, including:
providing an anti-rotation band that includes a band portion and a protrusion that extends from the band portion, the protrusion including a base portion that extends laterally from the band portion and a projecting portion extending axially from the base portion; and
providing a set of instructions on a tangible, non-transitory medium, the instructions including:
wrapping the anti-rotation band around a female nut of a hydraulic connector assembly; and
securing the anti-rotation band on the female nut so that the projecting portion of the protrusion extends tangentially adjacent to a stop tab located on a male body of the hydraulic connector assembly.

In some embodiments, the anti-rotation band provided in the step of providing an anti-rotation band includes clasping structures for securing the anti-rotation band to the female nut. In other embodiments, the method includes providing a standard cable tie, wherein the standard cable tie is utilized in the step of securing the anti-rotation band on the female nut. In various embodiments, the set of instructions further includes inserting the protrusion in a recess defined on an outer surface of the female nut, such that the projecting portion of the protrusion extends tangentially adjacent to a stop tab located on a male body of the hydraulic connector assembly. In one embodiment, the protrusion is integrally formed with the band portion.

International Patent Publication No. WO 2015/061501, owned by the owner of the present application, is hereby incorporated by reference herein in its entirety.

BRIEF DESCRIPTION OF THE DRAWINGS

FIGS. 14 and 15 are perspective views of a three-protrusion anti-rotation band according to an embodiment of the disclosure.

FIG. 16 is an enlarged, partial view of a first zip tie structure of FIG. 14 according to an embodiment of the disclosure.

FIG. 17 is a partial, profile view of a sawtooth structure of FIG. 14 according to an embodiment of the disclosure.

FIG. 18 is an enlarged, partial view of a second zip tie structure according to an embodiment of the disclosure.

FIG. 19 is a partial, profile view of a locking tooth structure of FIG. 18 according to an embodiment of the disclosure.

FIG. 20 is a perspective view of a three-protrusion anti-rotation band according to an embodiment of the disclosure.

FIG. 21 is an enlarged, partial view of a first zip tie structure of FIG. 20 according to an embodiment of the disclosure.

FIG. 22 is a partial, profile view of a sawtooth structure of FIG. 20 according to an embodiment of the disclosure.

FIG. 26 is a reverse perspective view of the three-protrusion anti-rotation band of FIG. 20 according to an embodiment of the disclosure.

FIG. 27 is an enlarged, partial view of a second zip tie structure of FIG. 26 according to an embodiment of the disclosure.

FIG. 28 is an enlarged, partial view of the first zip tie structure and the second zip tie structure of FIG. 20 in an interlocked configuration.

FIG. 29 depicts the three-protrusion band of FIGS. 14 and 15 in assembly with a hydraulic connector according to an embodiment of the disclosure.

DETAILED DESCRIPTION

Figure 1:
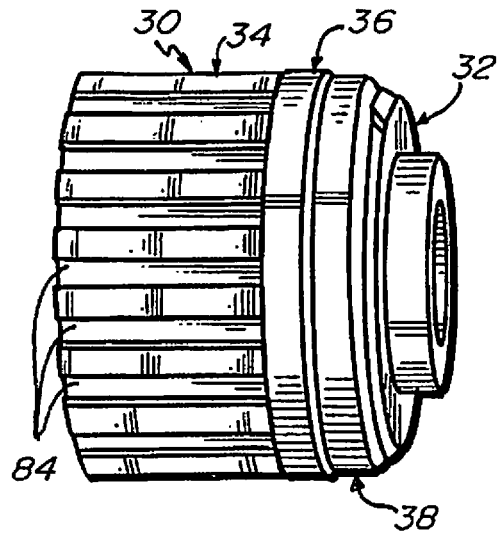
FIG. 1 is a perspective view of a fully assembled hydraulic connector assembly according to an embodiment of the disclosure.

Referring to FIGS. 1 through 5, a hydraulic connector assembly 30 is depicted according to an embodiment of the disclosure. The hydraulic connector assembly 30 includes a male body 32, a female nut 34 and an anti-rotation band 36. Optionally, the hydraulic connector assembly 30 can also include a connection verification structure 38.

The male body 32 includes a tubular portion 42 and a threaded connector portion 44 concentric about a central axis 46. The threaded connector portion 44 can be characterized as having a proximal end 48 and a distal end 52. An external thread 54 is formed on an exterior surface 56 of the threaded connector portion 44. In one embodiment, the tubular portion 42 and the threaded connector portion 44 are bridged by a flange portion 58 at the proximal end 48 of the connector portion.

For purposes of this application, "proximal" refers to a direction along the central axis 46 that progresses from the female nut 34 through the male body 32, and "distal" refers to a direction along the central axis 46 that progresses from the male body 32 through the female nut 34. The proximal direction is represented by arrow 60 and the distal direction by arrow 61 in FIG. 2.

In one embodiment, the connector portion 44 includes at least one stop tab 62 that extends radially outward from the connector portion 44, the stop tab(s) 62 being proximal to the external thread 54 and distal to the flange portion 58. In the depicted embodiment, the stop tabs 62 are diametrically opposed to each other on the male body 32 (identified as 62a and 62b in FIG. 3), each extending tangentially to define an arcuate segment 64 (FIG. 13A) about the central axis 46 having a tangential dimension. In one embodiment the tangential dimension is about 30°.

The female nut 34 can be characterized as having a proximal end 72 and a distal end 74, and includes an interior surface 76 having internal threads 78 formed thereon for threadable engagement with the external thread 54 of the male body 32. The female, nut 34 includes an exterior surface 82 that includes structure defining a plurality of recesses 84. The recesses 84 can extend from the proximal end 72 to the distal end 74 to define axially-extending channels. In one embodiment, the exterior surface 82 includes a necked down portion 86 at the proximal end 72.

The anti-rotation band 36 includes a band portion 88 that can be an arcuate structure having an interior surface 92. The anti-rotation band 36 is arranged to wrap at least partially around the exterior surface 82 of the female nut 34, thereby defining a proximal edge 90 and a distal edge 96. In the depicted embodiment, the interior surface 92 conforms to the contour of the necked down portion 86 of the female nut 34.

In one embodiment, at least one protrusion 94 projects radially inward from the interior surface 92. The protrusion(s) 94 can be characterized as extending laterally from the band portion 88 and as having a distal or base portion 102 and a proximal or projecting portion 104. The base portion 102 projects radially inward from the interior surface 92 of the anti-rotation band 36, and is dimensioned to have a width 106 (FIG. 5) that provides a sliding fit within the recesses 84 of the female nut 34. For embodiments that include the necked down portion 86 of the female nut 34, the base portion 102 can be formed to have a profile 108 that complements the profile of the necked down portion 86. The projecting portion 104 of the protrusion(s) 94 extends beyond the proximal edge 90 of the anti-rotation band 36.

In some embodiments, the anti-rotation band 36 extends tangentially around the circumference of the exterior surface 82 of the female nut 34. In one embodiment, the anti-rotation band 36 includes free ends 112 and 114 that include clasping arrangements 116 with complementary clasping structures for selectively joining the free ends 112 and 114.

The connection verification structure 38, if utilized, includes an outer wall 122 from which an interior flange portion 124 extends radially inward and registers against the flange portion 58 of the male body 32. The function of the connection verification structure 38 is to provide visual and audible verification that the female nut 34 properly secured to the male body 32, as described, for example, in "Prime-Lock® Minimum Tube Unions," P/N 01-1023457 (Rev. C 03/13), March 2013, available at http://www.entegrisfluidhandling.com/Documents/3110-7235-0313.pdf, last visited on Oct. 23, 2013, the disclosure of which is hereby incorporated by reference herein in its entirety except for express definitions contained therein.

Figure 2:
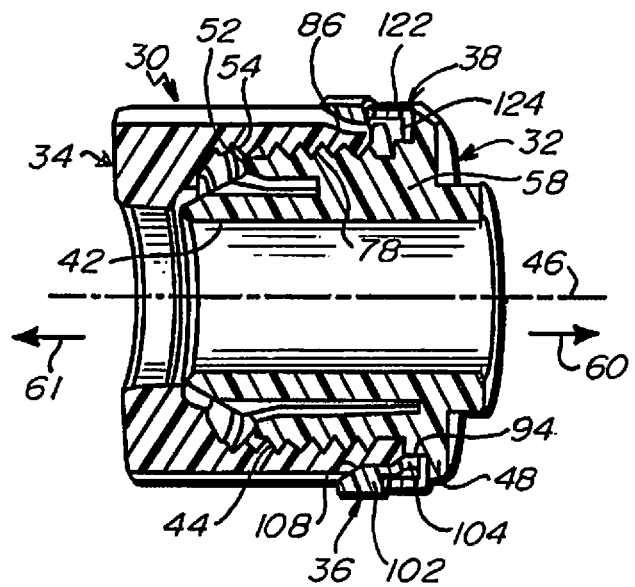
FIG. 2 is a sectional view of the hydraulic connector assembly of FIG. 1.

In assembly, a hose (not depicted) is fed through the female nut 34 and slid over the tubular portion 42 of the male body 32. The female nut 34 is then threaded onto the connector portion 44 and tightened to a prescribed torque specification to affect a compression fit on the hose. The anti-rotation band 36 is then strapped onto the exterior surface 82 of the female nut 34 at the distal end 74 of the female nut 34 so that the base portion(s) 102 of the protrusion(s) 94 are disposed in a respective one of the plurality of recesses 84. (For embodiments incorporating the connection verification structure 38, the necked down portion 86 of the female nut 34 is surrounded by the outer wall 122 in the assembled configuration, as depicted in FIG. 2.) In this way, the anti-rotation band 36 is coupled to the female nut 34 so that the anti-rotation band 36 rotates with the female nut 34.

Also in this configuration, the projecting portion(s) 104 of the protrusion(s) 94 extend beyond the proximal end of the female nut 34, so that the projecting portion(s) 104 are tangentially adjacent the stop tab(s) 62. Herein, "tangentially adjacent" means to be adjacent in the θ direction of the right-cylindrical coordinate system of FIG. 3, such that rotation of the stop tab(s) about the central axis 46 would cause contact with the projecting portion(s) 104. In one embodiment, the projecting portion(s) 104 of the protrusion(s) 94 extend past the stop tab(s) 62. That is, the proximal extremity of the projecting portion(s) 104 are proximal to the stop tab(s) 62.

In operation, when the female nut 34 is loosened and incidentally rotates about the central axis 46, the anti-rotation band 36 is carried therewith. In this way, anti-rotation band 36 and accompanying protrusion(s) 94 are also rotated until contact is made between the projecting portion 104 and the stop tab(s) 62. Once such contact is made, the anti-rotation band 36—and therefore the female nut 34—cannot rotate further.

The connection verification structure 38, or similar structure having the wall 122 and interior flange portion 124, can function as a retention ring that prevents the anti-rotation band 36 from sliding off the proximal end 72 of the female nut 34, and also can maintain the protrusion(s) 94 in an orientation for engagement with the stop tab 62.

Figure 4:
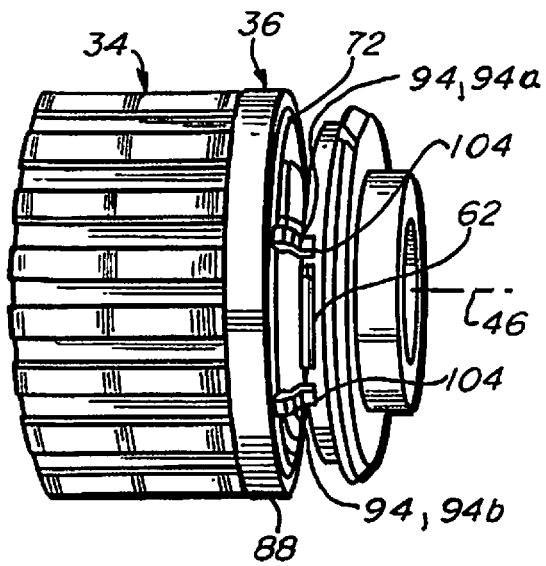
FIG. 4 is a perspective view of the hydraulic connector assembly of FIG. 1, sans the connection verification structure.
Figure 5:
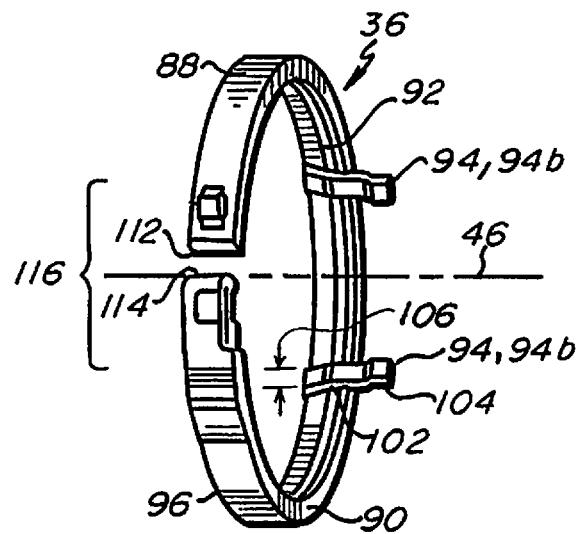
FIG. 5 is a perspective view of an anti-rotation band in isolation according to an embodiment of the disclosure.

In various embodiments, a pair of protrusions 94a and 94b are utilized, as depicted in the various embodiments and identified in FIG. 4. In one assembled configuration, the protrusions 94a and 94b straddle the stop tab 62. In other configurations (not depicted), the pair of protrusions 94a and 94b can be disposed between the pair of stop tabs 62a and 62b. The spacing between the protrusions 94a and 94b can be such that only a small angle of incidental rotation (e.g., on the order of θ=5°) is permitted in one of the configurations, while a larger angle of incidental rotation (e.g., on the order of 20°-30°) is permitted before there is engagement between the one of the protrusions 94a or 94b and the stop tab 62.

Figure 3:
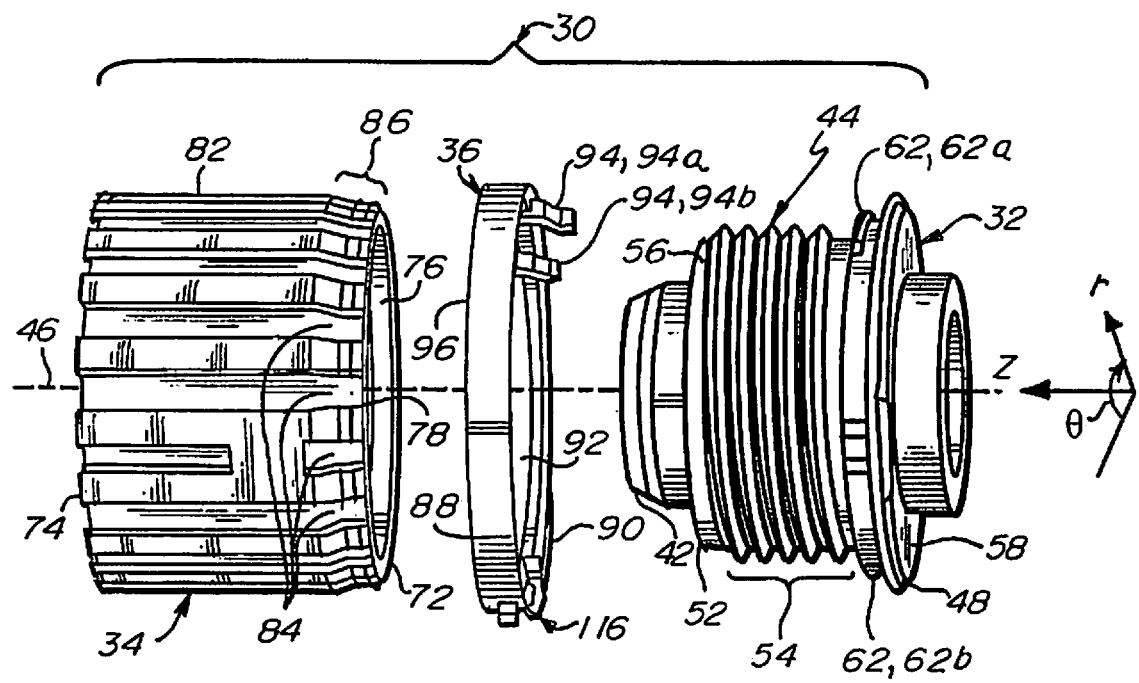
FIG. 3 is an exploded view of the hydraulic connector assembly of FIG. 1, sans the connection verification structure.

In other configurations (not depicted), the pair of protrusions 94a and 94b can be disposed between the pair of stop tabs 62a and 62b (e.g., FIG. 3). In such a configuration, incidental rotation would occur until one of the protrusions 94a or 94b makes contact with one of the stop tabs 62a or 62b. Again, the magnitude of the angle of incidental rotation is a matter of the spacing of the protrusions 94a and 94b relative to the stop tabs 62a and 62b.

In one non-limiting example embodiment, the protrusions 94a and 94b are centered substantially 60° apart relative to the central axis 46, with tangential spacing between the protrusions 94a and 94b on the order of 58° to 54°, and the stop tabs 62a, 62b each occupying an angular dimension on the order of 40° to 50° inclusive. By this arrangement, for two stop tabs 62a and 62b, the maximum rotation of the female nut 34 before one of the stop tabs 62a or 62b engages one of the protrusions 94a or 94b is on the order of 62° to 76° if the stop tabs 62a, 62b are both outside the interval between the protrusions 94a and 94b. The maximum rotation of the female nut 34 before one of the stop tabs 62a or 62b engages one of the protrusions 94a or 94b is on the order of 4° to 18° if one of the stop tabs 62a, 62b is within the interval between the protrusions 94a and 94b.

Again, the actual maximum degree of rotation before engagement between the protrusion 94 and the stop tab 62 depends on the specific dimensions and layout of the stop tab 62 and protrusions 94. In some embodiments, for configurations where the stop tabs 62a, 62b fall outside the interval between protrusions 94a and 94b, the maximum rotation is in the range of 60° to 90° inclusive. In other embodiments, the maximum rotation is in the range of 60° to 80° inclusive. In still other embodiments, the maximum rotation is in the range of 65° to 75° inclusive. For configurations where the stop tabs 62a, 62b fall within the interval between protrusions 94a and 94b, the maximum rotation can be in the range of 3° to 25° inclusive for various embodiments. For some embodiments, the maximum rotation can be in the range of 5° to 20° inclusive. For still other embodiments, the maximum rotation can be in the range of 5° to 15° inclusive or 5° to 10° inclusive.

It is noted that the portrayal herein of a pair of protrusions in the various depictions is non-limiting. A single protrusion can be utilized, as incidental rotation will, in any case, be less than one revolution. Also, knowing the direction of the incidental rotation, one can position the single protrusion at a rotational location relative to the stop tab 62 so that only a small angle of travel is permitted before contact with the stop tab 62. Furthermore, more than two protrusions can also be utilized.

Figure 6:
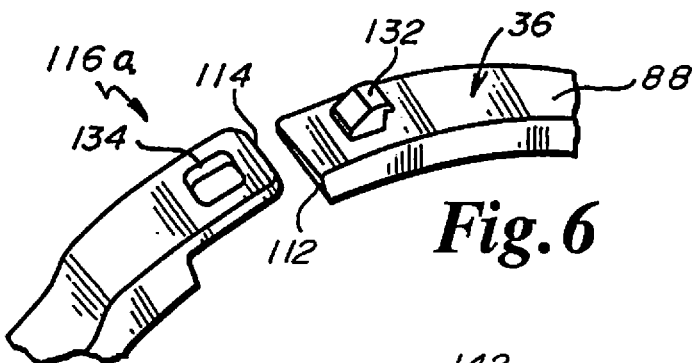
FIGS. 6 through 8 are enlarged partial views of clasping arrangements for the anti-rotation bands in embodiments of the disclosure.
Figure 7:
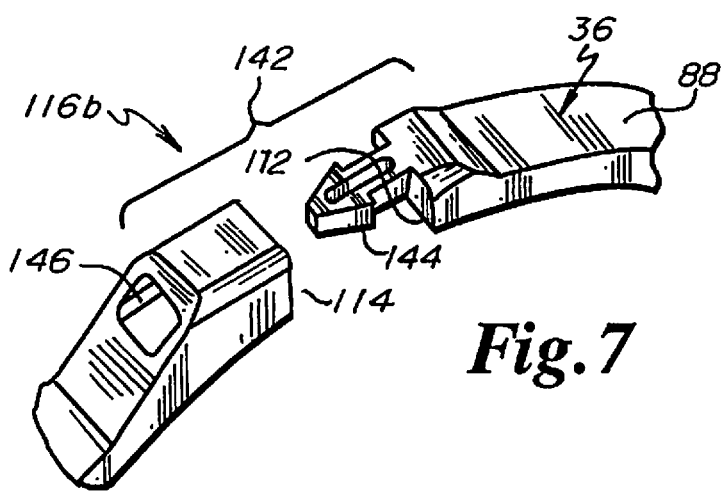
Figure 8:
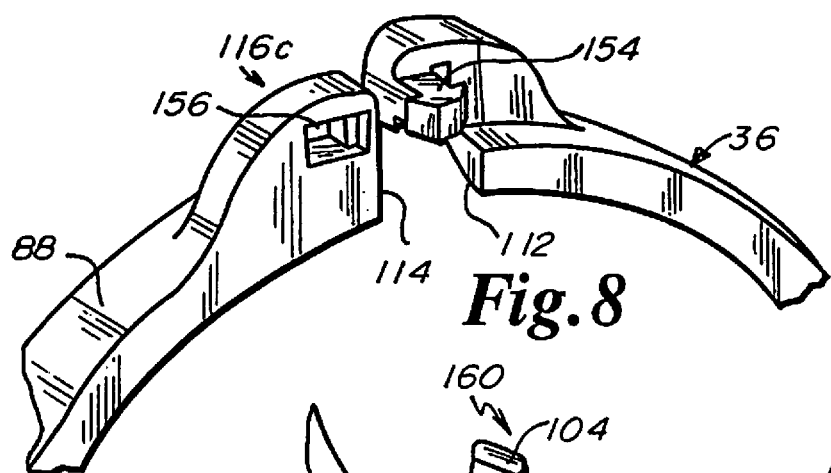

Referring to FIGS. 6 through 8, various clasping arrangements 116a, 116b and 116c are respectively depicted for coupling the free ends 112 and 114 together in embodiments of the disclosure. The clasping arrangement 116a includes a radially protruding barb 132 that mates with an aperture 134. The clasping arrangement 116b includes a snap-on connector arrangement 142 having a male snap 144 and a female receptacle 146, wherein the male snap 144 is slid tangentially into the female receptacle 146. The clasping arrangement 116c is also a snap-on connector arrangement having a male snap 154 and a female receptacle 156; however, the male snap 154 and the female receptacle 156 are arranged so that the male snap 154 is inserted into the female receptacle 156 in the axial direction (i.e., parallel to the central axis 46).

Figure 9:
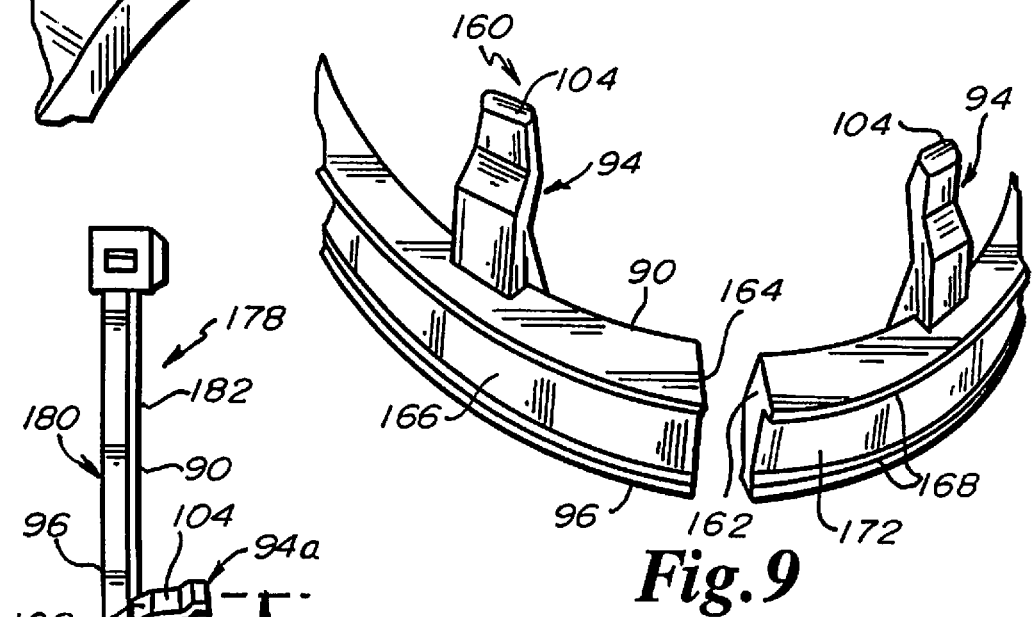
FIG. 9 is an enlarged, partial view of an open ended anti-rotation band according to an embodiment of the disclosure.

Referring to FIG. 9, an open ended anti-rotation band 160 is depicted in a disclosed embodiment. The open ended anti-rotation band 160 includes many of the same aspects as the anti-rotation bands 36 described above, which are indicated with like-numbered numerical references. The open ended anti-rotation band 160 includes free ends 162 and 164 that do not include clasping arrangements. Instead, an exterior surface 166 can include ridges 168 proximate the proximal and distal edges 90, 96 that define a tangential channel 172 therebetween. The tangential channel 172 can be used to capture a tying device (not depicted) such as a cord, a twist tie, or a conventional cable tie that loops around the open ended anti-rotation band 160. The tying device is tightened to secure the open ended anti-rotation band 160 to the female nut 34, with the protrusions 94 disposed in respective recesses 84.

Figure 11:
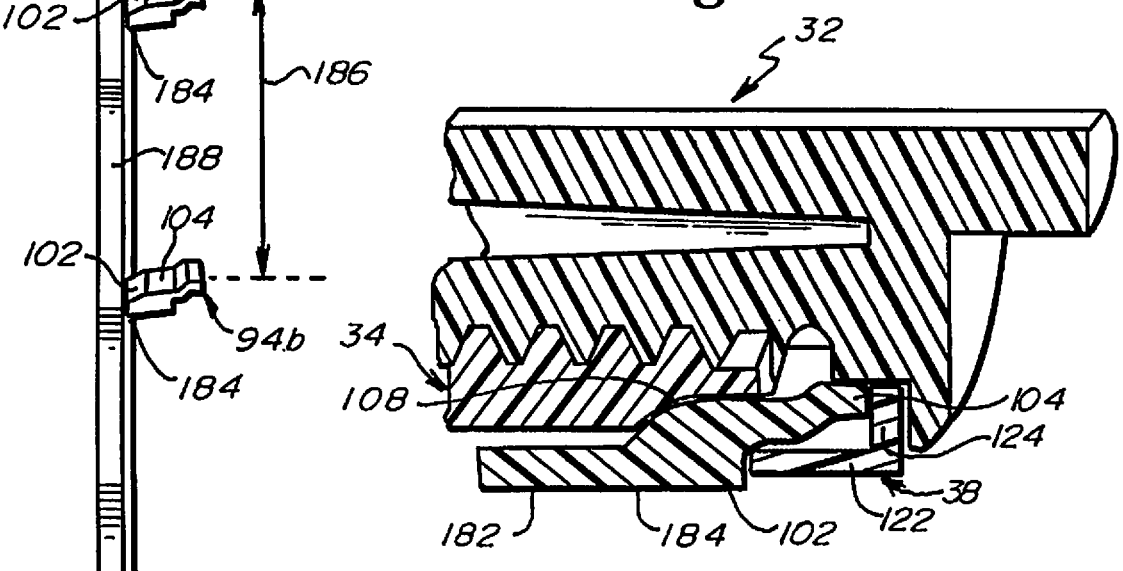
FIG. 11 is an enlarged, partial sectional view of a modified cable tie anti-rotation band according to an embodiment of the disclosure.
Figure 10:
FIG. 10 is an anti-rotation band including a modified cable tie according to an embodiment of the disclosure.
Figure 12:
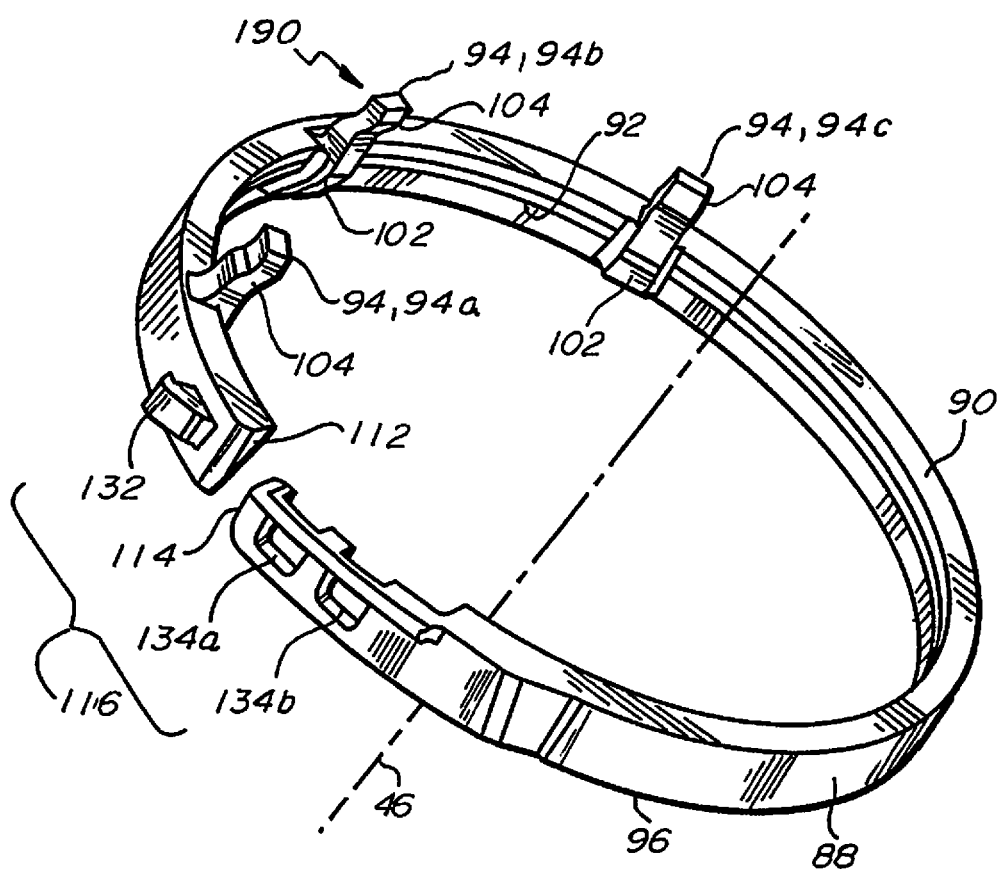
FIG. 12 is a perspective view of an anti-rotation band in isolation that includes three protrusions and two locking apertures according to an embodiment of the disclosure.

Referring to FIGS. 10 and 11, an anti-rotation band 178 including a modified cable tie 180 is depicted in a disclosed embodiment. The modified cable tie 180 includes a band portion or cable tie portion 182 with the protrusions 94a and 94b extending laterally from a proximal edge 90 thereof. In one embodiment, the protrusions 94a and 94b are integrally formed with the cable tie portion 182. The protrusions 94a and 94b can be characterized as having a distal end 184 (i.e., the distal extremity of the base portion 102) that is integral with the cable tie portion 182. Thus, for the anti-rotation band 178, the base portion 102 can be, but is not required to be, mounted to an interior face 188 of the cable tie portion 182.

In assembly, the modified cable tie 180 is mounted so that the cable tie portion 182 is distal to the necked down portion 86 of the female nut 34, where the exterior surface 82 of the female nut 34 tangentially defines a right cylinder. At such a location, the interior face 188 of the cable tie portion 182 conforms to the female nut 34. The modified cable tie 180 is positioned on the female nut 34 so that the protrusions 94a and 94b extend proximally and mate within the recesses 84 on the necked down portion 86 of the female nut 34. In one embodiment, a spacing 186 between the centers of the protrusions 94a and 94b is dimensioned so that the protrusions 94a and 94b register in respective recesses 84 on the necked down portion 86 of the female nut 34 when the modified cable tie 180 is wrapped around the female nut 34 and cinched into place.

It is noted that, in some embodiments, the protrusions 94a and 94b of the anti-rotation band 178 may easily deflect radially outward. The junction between the distal end 184 of the protrusions 94a, 94b might not offer much resistance to bending. Even if the coupling of the protrusion 94 to the cable tie portion 182 is enhanced by forming the protrusions 94a, 94b to the interior face 188 of the cable tie portion 182, the requisite flexibility of the cable tie portion 182 may cause it to roll away from the female nut 34 when the protrusions 94a, 94b are subject to an outward radial force. Accordingly, the connection verification structure 38 (or structure with similar features of the wall 122 and interior flange 124) may be required to capture the projecting portions 104 of the protrusions 94a and 94b to prevent them from rolling away from the female nut 32.

Figure 13A:
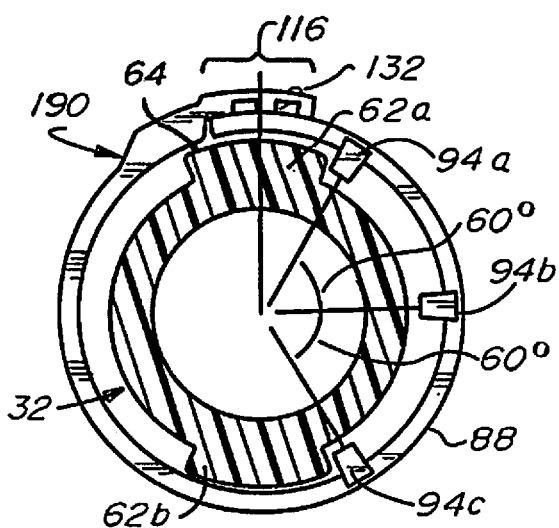
FIGS. 13A through 13F are end views of the three-protrusion anti-rotation band of FIG. 12 in interaction with stop tabs of a male body of a connector at various angular orientations.

Referring to FIG. 12 and FIGS. 13A-13F, a three-protrusion anti-rotation band 190 with dual locking apertures 134a and 134b is depicted according to an embodiment of the disclosure. The three-protrusion anti-rotation band 190 includes many of the same aspects as the anti-rotation band 36 described above, which are indicated with like-numbered numerical references. In addition, the three-protrusion anti-rotation band 190 includes a third protrusion 94c. In one embodiment, the three protrusions 94a, 94b, and 94c are spaced at tangentially uniform locations along the band portion 88; that is, the tangential spacing between protrusions 94a and 94b is the same as between protrusions 94b and 94c. The tangential spacing between protrusions 94a, 94b, and 94c can be dimensioned to readily accommodate the tangential dimension of stop tab 62 while engaging the stop tab 62 after a desired angle of incidental rotation. In the depicted embodiment, the protrusions 94a, 94b, and 94c are centered at substantially 60° intervals (FIG. 13A). Herein, "substantially 60°" is means 60° to within the manufacturing and assembly tolerance of the three-protrusion anti-rotation band 190.

In one embodiment, the clasping arrangement 116 of the three-protrusion anti-rotation band 190 includes two apertures 134a and 134b, each sized to accommodate the radially protruding barb 132 in a clasping arrangement. It is noted that the dual aperture arrangement is not limited to the three-protrusion anti-rotation band 190; that is, the dual aperture arrangement can be utilized with any of the embodiments disclosed herein that utilize clasping arrangements 116, such as depicted in FIGS. 6 through 8.

Functionally, for the embodiment of FIGS. 1 through 5 which includes two diametrically opposed stop tabs 62a and 62b, the provision of a third protrusion 94c enables the three-protrusion anti-rotation band 190 to be installed at six unique angular orientations uniformly distributed about the central axis 46. An advantage of having the flexibility of multiple angular orientations for installation is that the installer may be constrained to a narrow range of angular orientations within which the anti-rotation band can be installed. The narrow range may be imposed, for example, by extraneous appurtenances and equipment proximate the hydraulic connector assembly 30 that preclude installation at certain orientations.

Illustration of this capability is depicted in FIGS. 13A through 13F. In each of the FIGS. 13A through 13F, the male body 32 is arranged in the same orientation, with stop tabs 62a and 62b oriented in a 12:00 and 6:00 position, respectively. In reference to FIG. 13A, the clasping arrangement 116 is in substantial radial alignment with the stop tab 62a. By this arrangement, rotation of the three-protrusion anti-rotation band 190 in the clockwise direction will cause protrusion 94c to engage stop tab 62b, whereas rotation in the counterclockwise direction will cause protrusion 94a to engage with stop tab 62a. Either engagement will effectively halt the rotation (loosening) of the female nut 34 (to which the three-protrusion anti-rotation band 190 is coupled).

Figure 13B:
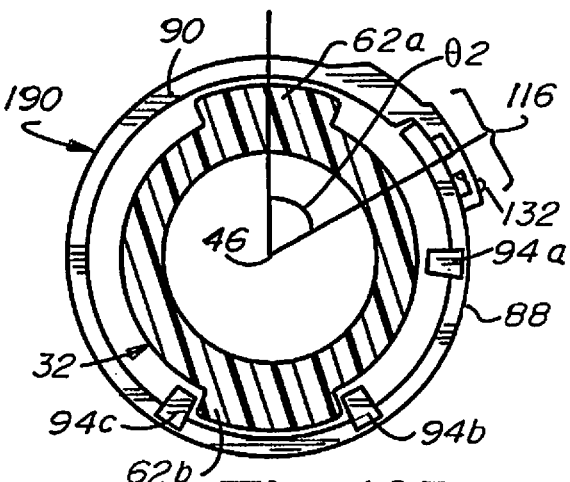

In reference to FIG. 13B the clasping arrangement 116 is rotationally offset at an angle θ2 relative to the stop tab 62a. For embodiments where the protrusions 94a, 94b, and 94c are spaced 60° apart, θ2 is also centered substantially at 60° relative to stop tab 62a (i.e., relative to the 12:00 position). By this arrangement, rotation of the three-protrusion anti-rotation band 190 in the clockwise direction will cause protrusion 94b to engage stop tab 62b, whereas rotation in the counterclockwise direction will cause protrusion 94c to engage with stop tab 62b, again effectively halting the loosening of the female nut 34.

Figure 13C:
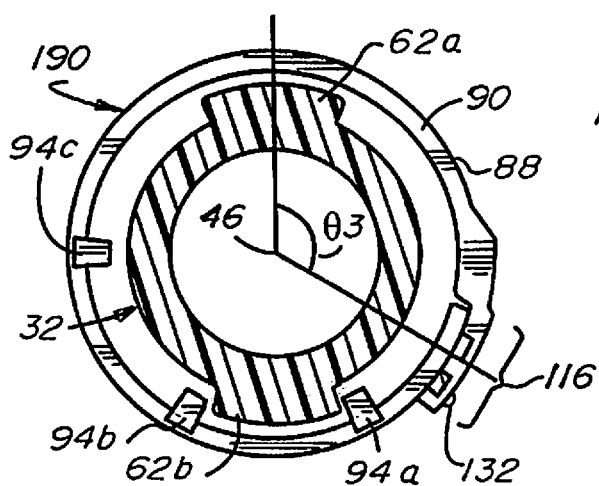

In reference to FIG. 13C the clasping arrangement 116 is rotationally offset at an angle θ3 relative to the stop tab 62a. For embodiments where the protrusions 94a, 94b, and 94c are spaced 60° apart, θ3 is centered substantially at 120° relative to the stop tab 62a. By this arrangement, rotation of the three-protrusion anti-rotation band 190 in the clockwise direction will cause protrusion 94a to engage stop tab 62b, whereas rotation in the counterclockwise direction will cause protrusion 94b to engage with stop tab 62b, again effectively halting the loosening of the female nut 34.

Figure 13D:
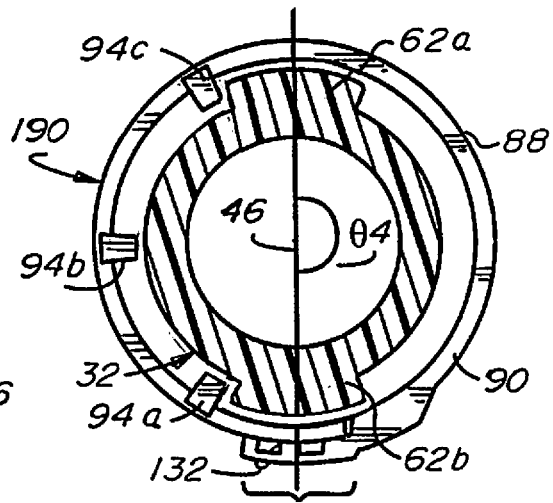

In reference to FIG. 13D the clasping arrangement 116 is rotationally offset at an angle θ4 relative to the stop tab 62a. For embodiments where the protrusions 94a, 94b, and 94c are spaced 60° apart, θ4 is centered substantially at 180° relative to the stop tab 62a. By this arrangement, rotation of the three-protrusion anti-rotation band 190 in the clockwise direction will cause protrusion 94c to engage stop tab 62a, whereas rotation in the counterclockwise direction will cause protrusion 94a to engage with stop tab 62b, again effectively halting the loosening of the female nut 34.

Figure 13E:
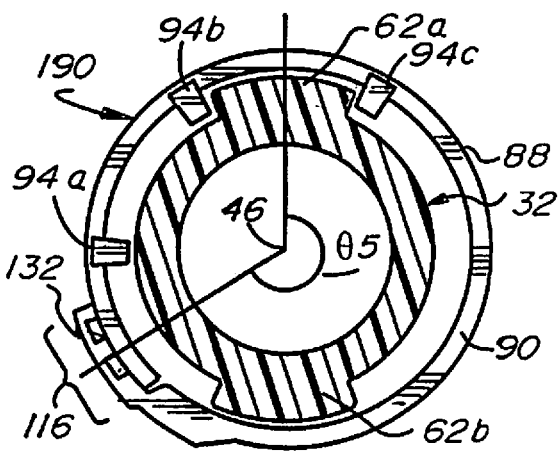

In reference to FIG. 13E the clasping arrangement 116 is rotationally offset at an angle θ5 relative to the stop tab 62a. For embodiments where the protrusions 94a, 94b, and 94c are spaced 60° apart, θ5 is centered substantially at 240° relative to the stop tab 62a. By this arrangement, rotation of the three-protrusion anti-rotation band 190 in the clockwise direction will cause protrusion 94b to engage stop tab 62a, whereas rotation in the counterclockwise direction will cause protrusion 94c to engage with stop tab 62a, again effectively halting the loosening of the female nut 34.

Figure 13F:
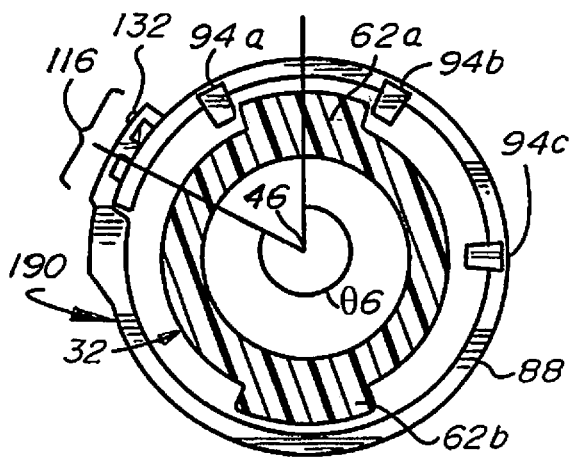
Figure 23:
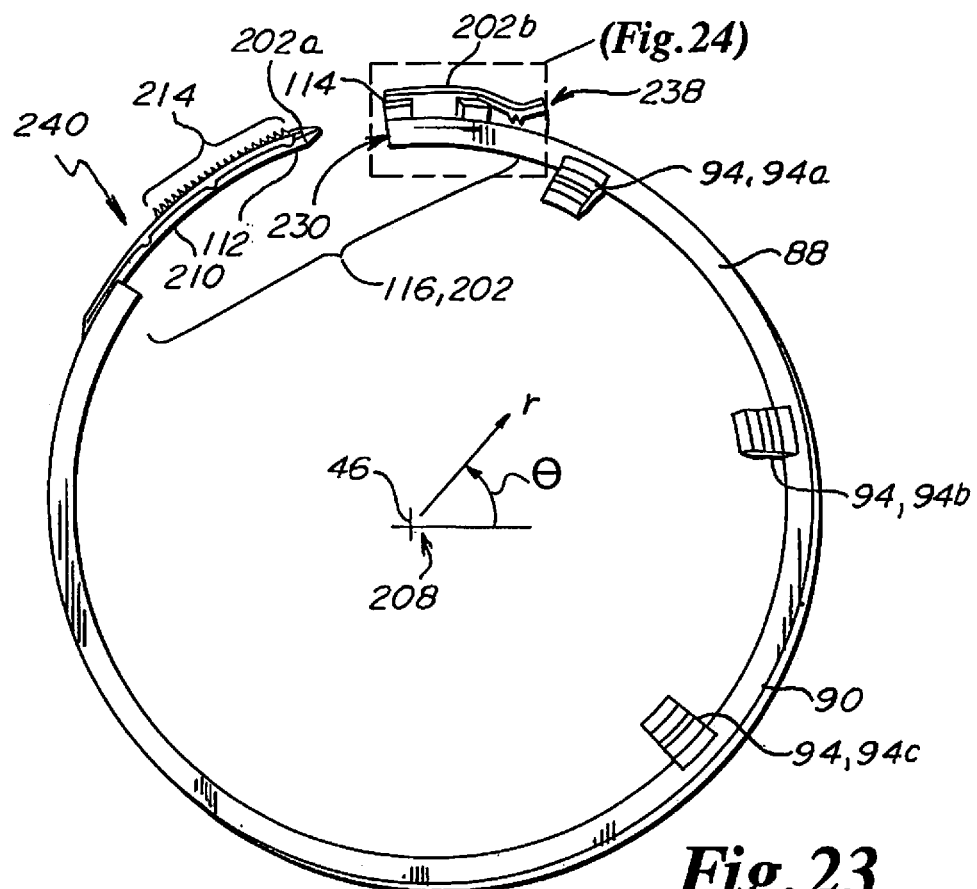
FIG. 23 is a perspective view of the three-protrusion anti-rotation band of FIG. 20.

In reference to FIG. 13F the clasping arrangement 116 is rotationally offset at an angle θ6 relative to the stop tab 62a. For embodiments where the protrusions 94a, 94b, and 94c are spaced 60° apart, θ6 is centered substantially at 300° relative to the stop tab 62a. By this arrangement, rotation of the three-protrusion anti-rotation band 190 in the clockwise direction will cause protrusion 94a to engage stop tab 62a, whereas rotation in the counterclockwise direction will cause protrusion 94b to engage with stop tab 62a, again effectively halting the loosening of the female nut 34.

Accordingly, the three-protrusion anti-rotation band 190, as depicted in FIGS. 12 and 13A through 13F, can be oriented in increments of 60°—six unique positions—about the central axis 46, while providing substantially the same amount of play in the loosening rotation of the female nut 34 before engagement with one of the stop tabs 62a, 62b, regardless of mounted orientation. This can enable ready installation of the three-protrusion anti-rotation band 190 in any of the multiple orientations while providing substantially the same low angle of rotational play or loosening before engagement with the stop tab 62. For example, for the angular layout discussed above, wherein the spacing between adjacent protrusions 94a, 94b and 94b, 94c is on the order of 58° to 54°, and the stop tabs 62a, 62b each occupying an angular dimension on the order of 40° to 50° inclusive, the maximum rotation of the female nut 34 before one of the stop tabs 62a or 62b engages one of the protrusions 94a or 94b is on the order of 4° to 18°, regardless of whether one of the stop tabs 62a, 62b is within or outside the interval between the two of the protrusions 94a, 94b or 94b, 94c. Also, depending on the dimensions and arrangements of the stop tabs 62 and protrusions 94, the maximum rotation can be in the range of 3° to 25° inclusive for various embodiments; for some embodiments, the maximum rotation can be in the range of 5° to 20° inclusive; for still other embodiments, the maximum rotation can be in the range of 5° to 15° inclusive or 5° to 10° inclusive.

Functionally, the dual apertures 134a and 134b of the three-protrusion anti-rotation band 190 can accommodate radial growth of the necked down portion 86 of the female nut 34 that can occur due to creep stress. The necked down portion 86 is more susceptible deformation, at least in part due to the reduced thickness of material relative to the main body of the female nut 34. In operation, when the female nut 34 is tightened onto the male body 32, the necked down portion 86 can deform radially outward. The radial growth can be permanent due to creep stresses, particularly when operating conditions entail elevated temperatures. Thus, the diameter of the female nut 34 at the necked down portion 86 may be larger after a period of service than for a new, unused female nut 34.

Accordingly, the dual apertures 134a and 134b can enable the three-protrusion anti-rotation band 190 to accommodate a new, unused female nut 34 or a used female nut 34 in a retrofit. The coupling barb 132 with aperture 134a can accommodate a first, larger diameter female nut 34 for retrofit situations, while coupling the barb 132 with aperture 134b can accommodate a second, smaller diameter for a new, unused female nut 34.

In one embodiment, the anti-rotation bands 36, 178, 190 are provided separately (i.e., without the male body 32 or the female nut 34) with instructions for installation. It is noted that certain aspects of the hydraulic connector assembly 30 are included in existing hydraulic connectors. For example, PRIMELOCK® fittings typically include the male body 32 with stop tabs 62a and 62b and flange 48 that cooperate with the connection verification structure 38. PRIMELOCK® fittings also typically include the female nut 34 with recesses 84 for engagement with a custom nut wrench. Accordingly, anti-rotation bands 36, 178, 190 can be configured as a retrofit for connector systems such as the PRIMELOCK®, complete with instructions for installation.

Referring to FIGS. 14 through 19, a three-protrusion anti-rotation band 200 is depicted according to an embodiment of the disclosure. The three-protrusion anti-rotation band 200 includes many of the same aspects as the anti-rotation bands 36 and 190 described above, which are indicated with like-numbered numerical references. The clasping arrangement 116 of the three-protrusion anti-rotation band 200 includes zip tie fastening structures 202 for interlocking first and second end opposed portions 204 and 206 of the three-protrusion anti-rotation band 200.

In the depicted embodiment, the anti-rotation band is centered about the origin of a r-θ-z (right cylindrical) coordinate system 208, the z-axis of the r-θ-z coordinate system 208 being coincident with the central axis 46. Herein, a "radial direction" is the r-direction, a "tangential direction" is the θ-direction, and an "axial direction" is the z-direction of the r-θ-z coordinate system 208.

In some embodiments, a first zip tie fastening structure 202a of the zip tie fastening structures 202 defines a spine portion 210 having an outer tangential face 212. A plurality of sawtooth structures 214 may extend radially outward from the outer tangential face 212 of the spine portion 210. Herein, a "sawtooth structure" defines a profile when viewed from the side (i.e., as viewed along the z-axis of the r-θ-z coordinate system 208) that has alternate steeper and gentler slopes.

Each of the plurality of sawtooth structures 214 includes a sliding face 216 and an engagement or locking face 218. Each sliding face 216 defines a nominal sliding face angle $\phi 1a$, and each locking face 218 defines a nominal locking face angle $\phi 1b$. Each of the angles $\phi 1a$ and $\phi 1b$ are defined relative to the radial direction r of the r-O-z coordinate system 208. In the depicted embodiment, the sliding face angle $\phi 1a$ is greater than ("gentler slope") the locking face angle $\phi 1b$ ("steeper slope").

In some embodiments, a second zip tie fastening structure 202b of the zip tie fastening structures 202 defines at least one locking tooth structure 224. Each of the at least one locking tooth structure 224 includes a locking face 228 defining a nominal locking face angle $\phi 2b$. As with the plurality of sawtooth structures 214 extending from the spine portion 210, the at least one locking tooth 224 may define a sawtooth structure having a sliding face 226, defining a nominal sliding face angle $\phi 2a$.

The locking face angles $\phi 1b$ and $\phi 2b$ of the respective locking faces 218 and 228 are dimensioned to interlock with each other in the tangential direction θ. In some embodiments, the locking face angles $\phi 1b$ and $\phi 2b$ are complementary; that is, the locking face angle $\phi 1b$ is of equal magnitude but in an opposite direction from the locking face angle $\phi 2b$ when engaged. In some embodiments, one or both of the locking face angles $\phi 1b$ and $\phi 2b$ is substantially zero (e.g., in substantial alignment with the radial direction r).

In various embodiments, the second end portion 206 includes an alignment structure 230. The alignment structure 230 may include opposing side portions 232 that extend radially outward from the band portion 88 and is capped by a top portion 234 (FIG. 18). The band portion 88, opposing side portions 232 and top portion 234 cooperate to define a channel or conduit 236 sized to accommodate the spine portion 210 with a sliding clearance fit.

In some embodiments, the at least one locking tooth structure 224 is disposed on a cantilevered or tab portion 238 that extends tangentially from the alignment structure 230. In the depicted embodiment of the 3-protrusion anti-rotation band 200, the tab portion 238 extends towards the first end portion 204 so that the tab portion 238 defines the free end 114 of the anti-rotation band 200.

In one or more embodiments, the anti-rotation band 200 can be readily released from the interlocked configuration. In these embodiments, the interlocked configuration between the sawtooth structures 214 and at least one locking tooth structure 224 is maintained by the resilience of the tab portion 238, which forces the at least one locking tooth structure 224 radially inward to interlock with the plurality of sawtooth structures 214. Accordingly, the anti-rotation band 200 can be released from the interlocked configuration by prying the tab portion 238 away from the first zip tie structure 202a.

Alternatively or in addition, the at least one locking tooth structure 224 may extend radially inward from the top portion 234 of the alignment structure 230, within the channel 236 defined by the alignment structure 230 (not depicted).

Referring to FIGS. 20 through 28, a three-protrusion anti-rotation band 240 is depicted according to an embodiment of the disclosure. The three-protrusion anti-rotation band 240 includes many of the same aspects as the anti-rotation band 200 described above, which are indicated with like-numbered numerical references.

Figure 24:
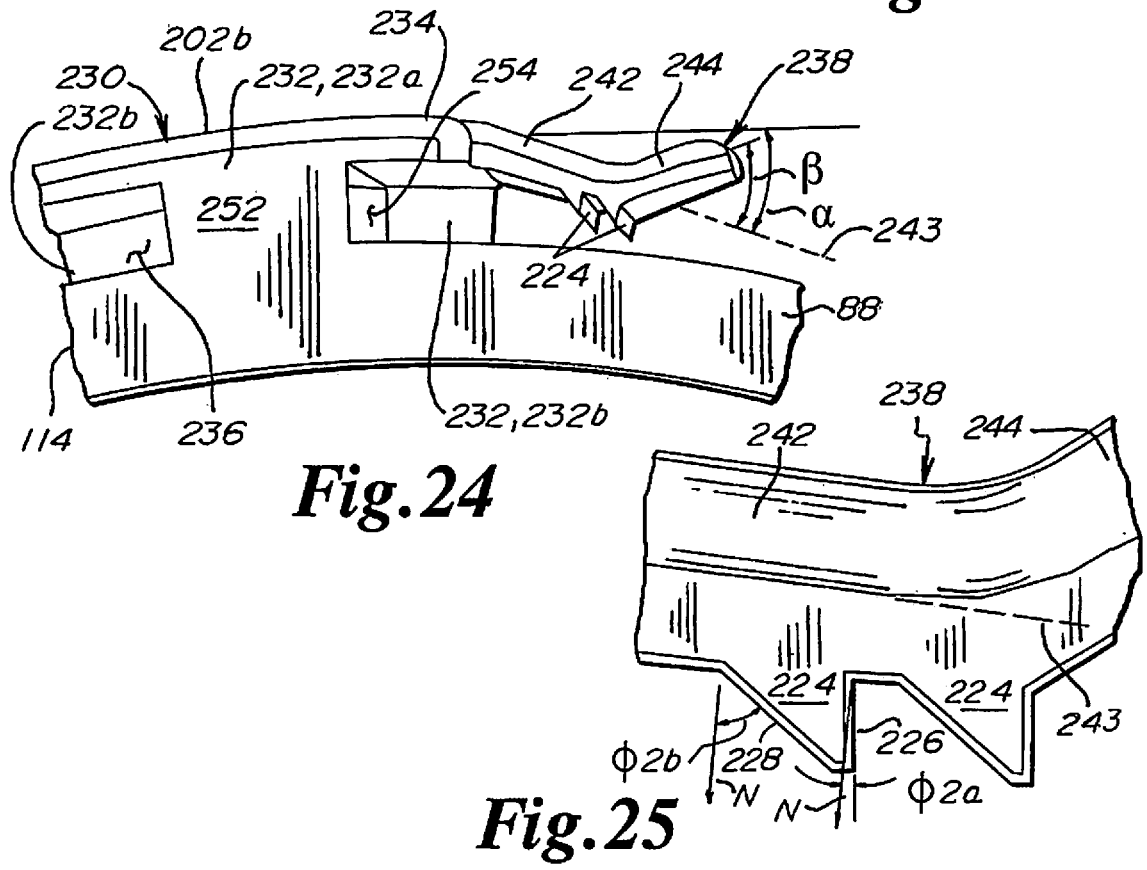
FIG. 24 is an enlarged, partial view of a second zip tie structure of FIG. 23 according to an embodiment of the disclosure.

A difference between the depicted embodiments of the anti-rotation band 240 and the anti-rotation band 200 is that, for the anti-rotation band 240, the tab portion 238 extends away from the free end 114 of the anti-rotation band 240, so that the alignment structure 230 is at the free end 114. In the depicted embodiment, a first section 242 of the tab portion 238 extends from the alignment structure 230 along an axis 243 (FIG. 24). The tab portion 238 may be formed so that the axis 243 extends at an angle α towards the band portion 88. A second section 244 of the tab portion 238 extends from the first section 242 and is formed to extend at an angle β relative to the first section 242, the angle β extending away from the band portion 88.

Functionally, the angling of the first section 242 of the tab portion 238 toward the band portion 88 biases the tab portion 238 toward the band portion 238. When the spine portion 210 is inserted through the alignment structure 230 and underneath the tab portion 238, the spine portion 210 displaces the tab portion 238 radially outward (FIG. 28). Because of the resilience of the tab portion 238, the radially outward displacement causes a bias force FB to exert radially inward due to the bending of the tab portion 238. The bias force FB helps maintain contact between the at least one locking tooth structure 224 and the plurality of sawtooth structures 214. The angling of the second section 244 of the tab portion 238 enables a user to easily pry the tab portion 238 away from the band portion 88 for releasing the at least one locking tooth structure 224 from the plurality of plurality of sawtooth structures 214.

Figure 25:
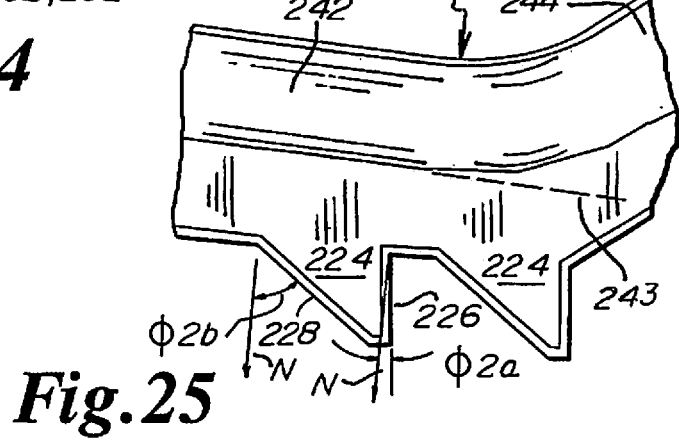
FIG. 25 is a partial, profile view of a locking tooth structure of FIG. 24 according to an embodiment of the disclosure.

Another difference between the depicted embodiments of the anti-rotation band 240 and the anti-rotation band 200 is that the locking face angle φ2b is defined from a vector N that is normal to the axis 243 of the first section 242 of the tab portion 238 (FIG. 25), rather than relative to a radial direction r. This enables the at least one locking tooth structure 224 to be in proper alignment with the engaged sawtooth structure 214 after the tab portion 238 is deflected radially outward, as best seen in FIG. 25.

In the depicted embodiment, a first side portion 232a of the opposing side portions 232 of the alignment structure 230 defines a post 252 that is centered with respect to the top portion 234 of the alignment structure 230 (FIG. 20). A second side portion 232b of the opposing side portions 232 of the alignment structure 230 defines an opening 254 that is centered with respect to the top portion 234 of the alignment structure 230 (FIG. 27).

Functionally, the structures of the first and second side portions 232a and 232b enable the alignment structure 230 to be extended in the tangential direction while providing more reliable flow of injection material during the molding of the anti-rotation band 240.

For one or both of the anti-rotation bands 200, 240, the sliding face 226 of the at least one locking tooth structure 224 of the second zip tie fastening structure 202b may be configured to slide over the sliding face 216 of each of the plurality of sawtooth structures 214 of the first zip tie fastening structure 202a. In reference to FIGS. 14 and 20, which depict the anti-rotation bands 200 and 240, respectively, in an open configuration, the sliding faces 216 and 226 of the of sawtooth structures 214 and the at least one locking tooth structure 224 are oriented to face each other in the tangential direction θ. The sliding face angles φ1a and φ2a are dimensioned to enable the at least one locking tooth structure 224 to slide over the sawtooth structures 214. In contrast, the locking face angles φ1b and φ2b are dimensioned to hook into each other, thereby locking the first and second fastening structures 202a and 202b together.

Referring to FIG. 29, installation of the anti-rotation band 200 is depicted according to an embodiment of the disclosure. While the anti-rotation band 200 is depicted in FIG. 28, the same procedure applies to the installation of the anti-rotation band 240. The anti-rotation band 200 or 240 is slid over or wrapped around the female nut 34 and inserted into the connection verification structure 38. Placement and location of the protrusions 94 may be done in accordance with procedures outlined above in accordance with the procedures for providing limited rotation of the anti-rotation band 200, 240. The first zip tie fastening structure 202a is slid into the alignment structure 230 of the second zip tie fastening structure 202b and drawn through the alignment structure 230 to tighten the anti-rotation band 200, 240 onto the female nut 34, to form a rotationally locked assembly 260. For clarity, the connection verification structure 38 is not depicted in the rotationally locked assembly 260.

The tightening of the anti-rotation band 200 draws the plurality of sawtooth structures 214 of the first zip tie structure 202a into a ratcheting contact with the at least one locking tooth structure 224 of the second zip tie structure 202b. Upon reaching a sufficiently tightened state, the locking faces 218 and 228 of the sawtooth structure 214 and at least one locking tooth structure 224 become interlocked to secure the anti-rotation band 200, 240 to the female nut 34 (FIG. 29).

Functionally, the alignment structure 230 contains the first zip tie fastening structure 202a in the lateral direction (i.e., parallel to the z-axis of coordinate system 208) and in the radial direction (i.e., parallel to the r-axis of coordinate system 208). Accordingly, the first zip tie fastening structure 202a can only be manipulated in the tangential direction. The alignment structure 230 also maintains alignment between the sawtooth structures 214 and the at least one locking tooth structure 224 so that the locking faces 218 and 228 are securely engaged. The zip tie structures 202 also enable personnel to tighten the anti-rotation band 200 after initial installation, should the anti-rotation band 200 become loosened, for example, due to thermal cycling and/or creep.

In various embodiments, instructions are provided on a tangible, non-transitory medium, such as paper, compact disc, or on a computer memory device, and can include the following steps:
wrapping the anti-rotation band 36, 178, 190, 200, 240 around a female nut 34 of the hydraulic connector assembly 30;
inserting the protrusion 94 in the recess 84, such that the projecting portion 104 of the protrusion 94 extends past the stop tab 62 located on the male body 32 of the hydraulic connector assembly 30; and
securing the anti-rotation band 36, 178, 190 on the female nut 34.

In one embodiment, a standard cable tie is provided to secure the anti-rotation band 36 to the female nut 34.

Each of the additional figures and methods disclosed herein can be used separately, or in conjunction with other features and methods, to provide improved containers and methods for making and using the same. Therefore, combinations of features and methods disclosed herein may not be necessary to practice the invention in its broadest sense and are instead disclosed merely to particularly describe representative and preferred embodiments of the instant invention.

Various modifications to the embodiments of the inventions may be apparent to one of skill in the art upon reading this disclosure. For example, persons of ordinary skill in the relevant art will recognize that the various features described for the different embodiments of the inventions can be suitably combined, un-combined, and re-combined with other features, alone, or in different combinations, within the spirit of the invention. Likewise, the various features described above should all be regarded as example embodiments, rather than limitations to the scope or spirit of the inventions. Therefore, the above is not contemplated to limit the scope of the inventions.

Persons of ordinary skill in the relevant arts will recognize that the inventions may include fewer features than illustrated in any individual embodiment described above. The embodiments described herein are not meant to be an exhaustive presentation of the ways in which the various features of the inventions may be combined. Accordingly, the embodiments are not mutually exclusive combinations of features; rather, the inventions may include a combination of different individual features selected from different individual embodiments, as understood by persons of ordinary skill in the art.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

References to "embodiment(s)", "embodiment(s) of the disclosure", and "disclosed embodiment(s)" contained herein refer to the specification (text, including the claims, and figures) of this patent application that are not admitted prior art.

For purposes of interpreting the claims for the embodiments of the inventions, it is expressly intended that the provisions of 35 U.S.C. 112(6) are not to be invoked unless the specific terms "means for" or "step for" are recited in the respective claim.

What is claimed is:

1. An anti-rotation band for a hydraulic connector including a stop structure, comprising:
 a band portion including opposed end portions and defining a proximal edge, the opposed end portions including zip tie fastening structures; and
 a plurality of protrusions that extend from the band portion, each of the plurality of protrusions including a base portion and a projecting portion, each of the base portions being integral with an interior surface of the band portion and projecting radially inward from the interior surface of the band portion, each of the projecting portions of the plurality of protrusions extending laterally away from the proximal edge of the band portion in a direction that is parallel to a central axis extending through the band portion, each of the plurality of projection portions being configured to engage the stop structure to limit rotation of a hydraulic connector.

2. The anti-rotation band of claim 1, wherein:
 a first end portion of the opposed end portions includes a first zip tie fastening structure that defines a plurality of sawtooth structures, each of the plurality of sawtooth structures including a sliding face and a locking face;
 a second end portion of the opposed end portions includes a second zip tie fastening structure that defines at least one locking tooth structure, each of the at least one locking tooth structure including a locking face;
 the second zip tie fastening structure is configured to slide over the sliding face of each of the plurality of sawtooth structures of the first zip tie fastening structure; and
 the locking face of the at least one locking tooth structure of the second zip tie fastening structure is configured to interlock with any one of the plurality of sawtooth structures of the first zip tie fastening structure.

3. The anti-rotation band of claim 2, wherein the locking face of the at least one locking tooth structure of the second zip tie fastening structure is complementary to the locking face of each of the plurality of sawtooth structures of the first zip tie fastening structure.

4. The anti-rotation band of claim 2, wherein each of the at least one locking tooth structure includes a sliding face.

5. The anti-rotation band of claim 2, wherein the second end portion includes an alignment structure for aligning the first end portion with the second end portion in a tangential direction when the first end portion is interlocked with the second end portion.

6. The anti-rotation band of claim 5, wherein the at least one locking tooth structure of the second end portion is defined on a tab portion, the tab portion extending in the tangential direction from the alignment structure.

7. The anti-rotation band of claim 6, wherein the alignment structure of the anti-rotation band defines a free end of the second end portion, the tab portion extending away from the free end.

8. The anti-rotation band of claim 1, wherein the plurality of protrusions includes three protrusions.

9. The anti-rotation band of claim 8, wherein a distance between a first of the three protrusions and a second of the three protrusions is equal to a distance between the second of the three protrusions and a third of the three protrusions.

10. The anti-rotation band of claim 1, wherein the band is arcuate and the surface is an interior surface and the base portion extends radially inward from the interior surface.

11. A hydraulic connector assembly, comprising:
 a male body threadably engaged with a hydraulic connector comprising a female nut, the male body including a stop structure including stop tabs that extend radially outward therefrom, the female nut being concentric about a central axis and including a recess formed on an exterior surface thereof; and
 an anti-rotation band engaged with and extending tangentially around the female nut to define a proximal edge of the anti-rotation band, the anti-rotation band including a band portion defining the proximal edge and including opposed end portions having zip tie fastening structures, an interior surface, and a plurality of protrusions that extend from the band portion, each of the plurality of protrusions including a base portion and a projecting portion, each of the base portions being integral with an interior surface of the band portion and projecting radially inward from the interior surface of the band portion, each of projection portions of the plurality of protrusions extending laterally away from the proximal edge of the anti-rotation band in a direction parallel to a central axis extending through the anti-rotation band, the projecting portion being configured to engage the stop structure of the hydraulic connector to limit rotation of the hydraulic connector and the base portion extending radially inward from the interior surface of the band portion, the base portion of each protrusion being disposed within the recess of the female nut,
 wherein rotation of the female nut relative to the male body causes the anti-rotation band to rotate therewith and causes each projecting portion to engage with a respective stop tab of the male body, thereby preventing further rotation of the female nut.

12. The hydraulic connector assembly of claim 11, wherein the zip tie fastening structures are releasable.

13. The hydraulic connector assembly of claim 12, wherein:
 a first end portion of the opposed end portions includes a first zip tie fastening structure that defines a plurality of sawtooth structures, each of the plurality of sawtooth structures including a sliding face and a locking face;
 a second end portion of the opposed end portions includes a second zip tie fastening structure that defines at least one locking tooth structure, each of the at least one locking tooth structure including a locking face;
 the at least one locking tooth structure of the second zip tie fastening structure is configured to slide over the sliding face of each of the plurality of sawtooth structures of the first zip tie fastening structure; and
 the locking face of the at least one locking tooth structure of the second zip tie fastening structure is configured to interlock with any one of the plurality of sawtooth structures of the first zip tie fastening structure.

14. The hydraulic connector assembly of claim 13, wherein:

the locking faces of the plurality of sawtooth structures of the first zip tie fastening structure defines a first locking face angle;

the locking face of the at least one locking tooth structure defines a second locking face angle; and the first locking face angle is complementary to the second locking face angle of each of the plurality of sawtooth structures of the first zip tie fastening structure.

15. The hydraulic connector assembly of claim 13, wherein the second end portion includes an alignment structure for aligning the first end portion with the second end portion in a tangential direction when the first zip tie fastening structure is interlocked with the second zip tie fastening structure.

16. The hydraulic connector assembly of claim 15, wherein the at least one locking tooth structure of the second zip tie fastening structure is defined on a tab portion, the tab portion extending in the tangential direction from the alignment structure.

17. The hydraulic connector assembly of claim 16, wherein the alignment structure of the anti-rotation band defines a free end of the second end portion, the tab portion extending away from the free end.

18. The hydraulic connector assembly of claim 17, wherein the tab portion includes a first section that extends tangentially from the alignment structure and angles toward the band portion when the anti-rotation band is in an open configuration, the tab portion being deflected radially outward when the first zip tie fastening structure is interlocked with the second zip tie fastening structure, the tab portion exerting a biasing force against the first zip tie fastening structure when the first zip tie fastening structure is interlocked with the second zip tie fastening structure.

19. The hydraulic connector of claim 18, wherein the tab portion includes a second section that extends tangentially from the first section and angles away from the band portion for prying the tab portion away from the band portion to release the second zip tie fastening structure from the first zip tie fastening structure.

* * * * *